US009292468B2

(12) United States Patent
Varma et al.

(10) Patent No.: US 9,292,468 B2
(45) Date of Patent: Mar. 22, 2016

(54) PERFORMING FREQUENCY COORDINATION IN A MULTIPROCESSOR SYSTEM BASED ON RESPONSE TIMING OPTIMIZATION

(71) Applicant: Intel Corporation, Santa Clara, CA (US)

(72) Inventors: Ankush Varma, Hillsboro, OR (US); Krishnakanth V. Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 13/716,801

(22) Filed: Dec. 17, 2012

(65) Prior Publication Data

US 2014/0173248 A1 Jun. 19, 2014

(51) Int. Cl.
*G06F 15/173* (2006.01)
*G06F 9/38* (2006.01)
*G06F 1/32* (2006.01)

(52) U.S. Cl.
CPC ........ *G06F 15/17325* (2013.01); *G06F 1/3296* (2013.01); *G06F 9/3824* (2013.01); *G06F 9/3836* (2013.01); *G06F 9/3851* (2013.01); *G06F 9/3885* (2013.01); *G06F 9/3891* (2013.01)

(58) Field of Classification Search
CPC ... G06F 9/3885; G06F 9/3851; G06F 9/3824; G06F 9/3836; G06F 9/3891
See application file for complete search history.

(56) References Cited

U.S. PATENT DOCUMENTS

| | | | |
|---|---|---|---|
| 5,163,153 A | 11/1992 | Cole et al. | |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,449,291 B1 * | 9/2002 | Burns et al. | 370/516 |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |

(Continued)

FOREIGN PATENT DOCUMENTS

EP      1 282 030 A1      5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Farley Abad
(74) *Attorney, Agent, or Firm* — Trop, Pruner & Hu, P.C.

(57) ABSTRACT

In an embodiment, a processor includes a core to execute instructions and a logic to receive memory access requests from the core and to route the memory access requests to a local memory and to route snoop requests corresponding to the memory access requests to a remote processor. The logic is configured to maintain latency information regarding a difference between receipt of responses to the snoop requests from the remote processor and receipt of responses to the memory access requests from the local memory. Other embodiments are described and claimed.

22 Claims, 9 Drawing Sheets

(56) References Cited

U.S. PATENT DOCUMENTS

| | | | |
|---|---|---|---|
| 7,093,147 | B2 | 8/2006 | Farkas et al. |
| 7,111,179 | B1 | 9/2006 | Girson et al. |
| 7,194,643 | B2 | 3/2007 | Gonzalez et al. |
| 7,272,730 | B1 | 9/2007 | Acquaviva et al. |
| 7,412,615 | B2 | 8/2008 | Yokota et al. |
| 7,434,073 | B2 | 10/2008 | Magklis |
| 7,437,270 | B2 | 10/2008 | Song et al. |
| 7,454,632 | B2 | 11/2008 | Kardach et al. |
| 7,529,956 | B2 | 5/2009 | Stufflebeam |
| 7,539,885 | B2 | 5/2009 | Ma |
| 7,730,340 | B2 | 6/2010 | Hu et al. |
| 8,732,308 | B1 * | 5/2014 | Talwar et al. ............. 709/226 |
| 2001/0044909 | A1 | 11/2001 | Oh et al. |
| 2002/0194509 | A1 | 12/2002 | Plante et al. |
| 2003/0061383 | A1 | 3/2003 | Zilka |
| 2004/0019777 | A1 | 1/2004 | Wygant |
| 2004/0064752 | A1 | 4/2004 | Kazachinsky et al. |
| 2004/0098560 | A1 | 5/2004 | Storvik et al. |
| 2004/0139356 | A1 | 7/2004 | Ma |
| 2004/0268166 | A1 | 12/2004 | Farkas et al. |
| 2005/0022038 | A1 | 1/2005 | Kaushik et al. |
| 2005/0033881 | A1 | 2/2005 | Yao |
| 2005/0132238 | A1 | 6/2005 | Nanja |
| 2005/0166033 | A1 | 7/2005 | Jacob |
| 2006/0050670 | A1 | 3/2006 | Hillyard et al. |
| 2006/0053326 | A1 | 3/2006 | Naveh |
| 2006/0059286 | A1 | 3/2006 | Bertone et al. |
| 2006/0069936 | A1 | 3/2006 | Lint et al. |
| 2006/0080508 | A1 | 4/2006 | Hoover et al. |
| 2006/0080512 | A1 * | 4/2006 | Hoover et al. ............. 711/141 |
| 2006/0117202 | A1 | 6/2006 | Magklis et al. |
| 2006/0179244 | A1 | 8/2006 | Goodman et al. |
| 2006/0184287 | A1 | 8/2006 | Belady et al. |
| 2007/0005995 | A1 | 1/2007 | Kardach et al. |
| 2007/0016817 | A1 | 1/2007 | Albonesi et al. |
| 2007/0079294 | A1 | 4/2007 | Knight |
| 2007/0106827 | A1 | 5/2007 | Boatright et al. |
| 2007/0156370 | A1 | 7/2007 | White et al. |
| 2007/0156992 | A1 | 7/2007 | Jahagirdar |
| 2007/0180279 | A1 | 8/2007 | Sullam |
| 2007/0214342 | A1 | 9/2007 | Newburn |
| 2007/0239398 | A1 | 10/2007 | Song et al. |
| 2007/0245163 | A1 | 10/2007 | Lu et al. |
| 2008/0005485 | A1 | 1/2008 | Gilbert et al. |
| 2008/0028240 | A1 | 1/2008 | Arai et al. |
| 2008/0148027 | A1 | 6/2008 | Fenger et al. |
| 2008/0250260 | A1 | 10/2008 | Tomita |
| 2009/0006871 | A1 | 1/2009 | Liu et al. |
| 2009/0150695 | A1 | 6/2009 | Song et al. |
| 2009/0150696 | A1 | 6/2009 | Song et al. |
| 2009/0158061 | A1 | 6/2009 | Schmitz et al. |
| 2009/0158067 | A1 | 6/2009 | Bodas et al. |
| 2009/0172375 | A1 | 7/2009 | Rotem et al. |
| 2009/0172428 | A1 | 7/2009 | Lee |
| 2009/0235105 | A1 | 9/2009 | Branover et al. |
| 2010/0115309 | A1 | 5/2010 | Carvalho et al. |
| 2010/0146513 | A1 | 6/2010 | Song |
| 2010/0191997 | A1 | 7/2010 | Dodeja et al. |
| 2011/0099397 | A1 | 4/2011 | Rotem et al. |
| 2011/0138212 | A1 | 6/2011 | Zagacki |
| 2011/0154090 | A1 | 6/2011 | Dixon et al. |
| 2012/0079290 | A1 * | 3/2012 | Kumar et al. ............. 713/300 |
| 2012/0246506 | A1 | 9/2012 | Knight |
| 2013/0111236 | A1 | 5/2013 | Ananthakrishnan et al. |

OTHER PUBLICATIONS

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, filed Sep. 28, 2011, entitled, "Estimating Temperature of a Processor Core in a Low Power State", by Avinash N. Ananthakrishnan, et al.

U.S. Appl. No. 13/282,896, filed Oct. 27, 2011, entitled, "Enabling a Non-Core Domain to Control Memory Bandwidth", by Avinash N. Ananthakrishnan, et al.

U.S. Appl. No. 13/282,947, filed Oct. 27, 2011, entitled, "Controlling Operating Frequency of a Core Domain Via a Non-Core Domain of a Multi-Domain Processor", by Avinash N. Ananthakrishnan, et al.

U.S. Appl. No. 13/285,414, filed Oct. 31, 2011, entitled, "Controlling a Turbo Mode Frequency of a Processor," by Avinash N. Ananthakrishnan, et al.

U.S. Appl. No. 13/247,580, filed Sep. 28, 2011, entitled, "Controlling Temperature of Multiple Domains of a Multi-Domain Processor," by Avinash N. Ananthakrishnan, et al.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

U.S. Appl. No. 13/600,568, filed Aug. 31, 2012, entitled, "Configuring Power Management Functionality in a Processor," by Malini K. Bhandaru, et al.

International Searching Authority, "Notification of Transmittal of the International Search Report and the Written Opinion of the International Searching Authority," mailed Oct. 25, 2013, in International application No. PCT/US2013/048079.

U.S. Appl. No. 13/716,712, filed Dec. 17, 2012, entitled "Performing Frequency Coordination in a Multiprocessor System," by Ankush Varma, et al.

U.S. Patent and Trademark Office, Office Action mailed Sep. 29, 2015 in U.S. Appl. No. 13/716,712.

U.S. Patent and Trademark Office, Office Action mailed Mar. 12, 2015 and Reply Jun. 10, 2015 in U.S. Appl. No. 13/716,801.

* cited by examiner

PERFORMING FREQUENCY COORDINATION IN A MULTIPROCESSOR SYSTEM BASED ON RESPONSE TIMING OPTIMIZATION

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

In a multiprocessor system, latency of an access to a remote processor is determined by the remote processor's frequency, more specifically, a frequency of a non-core portion of the processor, often referred to as an uncore. Standard power management features reduce uncore frequency when cores are inactive. This creates a scenario such that when cores of one processor seek to access another processor and the remote processor has idle/inactive cores (and thus low uncore frequency), this low remote frequency will cause an increase in the response time. While the remote processor can maintain a fixed frequency for this uncore frequency, this can increase power consumption and still may not resolve the problem of high latency, particularly in low bandwidth workloads.

DETAILED DESCRIPTION

Figure 1:
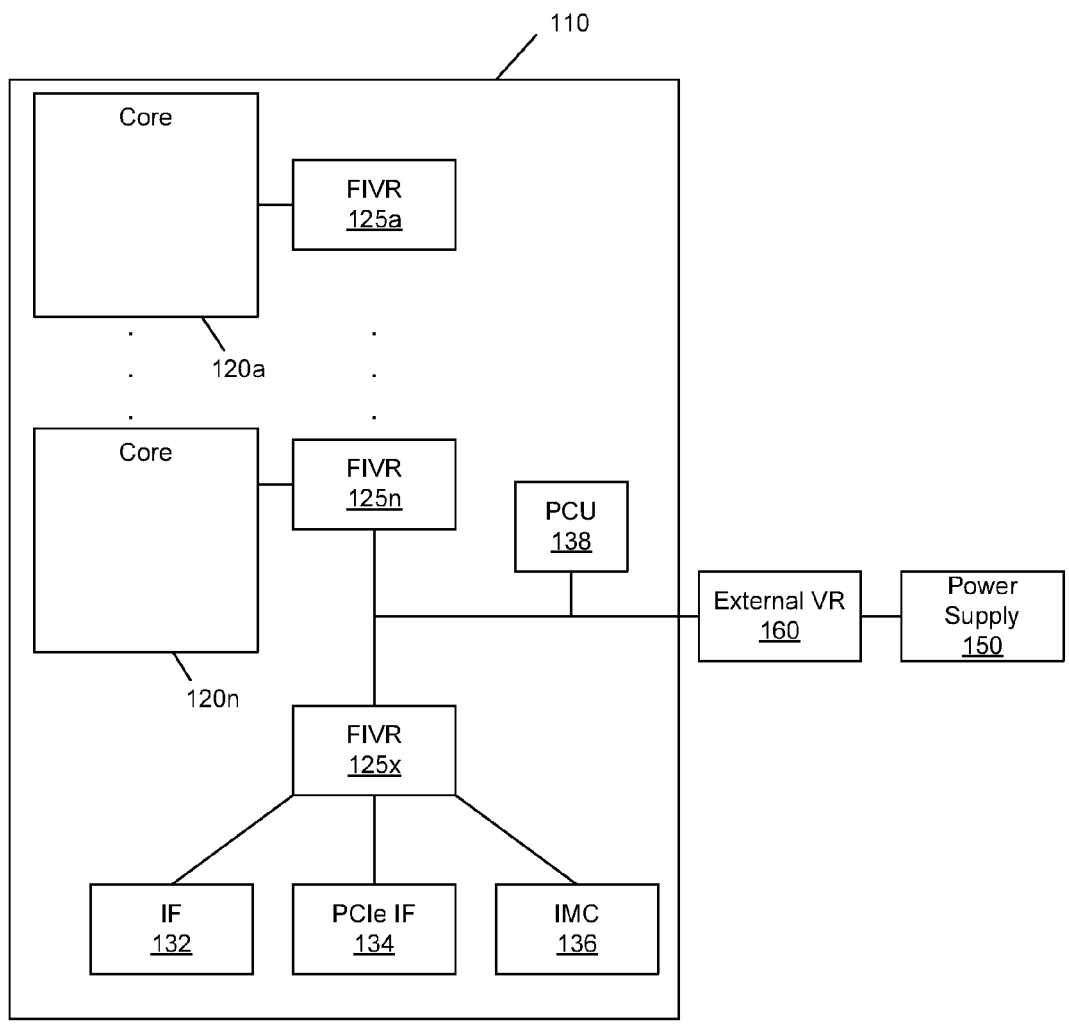
FIG. 1 is a block diagram of a portion of a system in accordance with an embodiment of the present invention.

In various embodiments, a detection mechanism can detect a condition in which response latency for a response received in a first processor is constrained by a remote processor. Responsive to this detection a communication can be generated and sent to the remote processor. In turn, operations may occur at the remote processor to increase uncore frequency to alleviate the performance loss. These processors may be respective processor sockets of a multiprocessor system such as a given personal computer, server computer, mobile device, or other computing device.

In an embodiment a sensor may count transactions where performance (or response latency) is sensitive to a frequency of the remote processor. That is, a processor includes a home agent configured to receive, responsive to a memory access transaction, a snoop response from the remote processor and data from an access to local memory. The home agent will frequently have to wait for both of these responses to be received to check that there are no conflicts prior to continuing with the transaction. Only the latency of the snoop response from the remote processor is determined by the remote processor frequency.

A set of counters may be provided to aid in quantifying the performance benefit possible from speeding up a frequency of the remote processor. In an embodiment, a first counter is configured to count the number of transactions where a remote snoop response was received after a local memory response. And a second counter is configured to count the total number of cycles where the home agent (or other coherency controller) waited for the remote snoop response.

In turn, these counters can be read by a power controller of a processor such as a power control unit (PCU) and compared against programmed thresholds to determine based on this latency information if there is sufficient performance benefit to trigger an inter-processor frequency coordination request. Note that as described herein, this frequency coordination may take different forms, including a situation in which the frequency of non-core circuitry, also referred to herein as system agent or so-called uncore circuitry, is set at a common frequency across multiple processor sockets. In other situations, this frequency coordination may take the form of a request from one processor socket to another socket (or sockets) to seek an update to the uncore frequency, to improve latency of inter-processor communication. Furthermore, understand that while implementations described herein are with regard to processor sockets that can operate at independent frequencies for different domains including an uncore domain, embodiments apply equally to processors that operate at a single frequency. Furthermore, while described herein as performing frequency coordination with regard to uncore frequency, in some embodiments this frequency coordination may be for additional or different components of a processor socket, such as an interconnect frequency in an implementation in which an interconnect frequency such as a ring interconnect of a processor socket operates at a different frequency than an uncore circuit.

Although the scope of the present invention is not limited in this regard, uncore frequency coordination control as described herein can be implemented via firmware, hardware, software, and combinations thereof, to thus enable detection of an undesired latency, communication of a request to at least one other processor socket to enable an increased uncore frequency to reduce the latency.

In an embodiment, a frequency coordination request may be a PCU-to-PCU message tunneled over an inter-processor link. When a processor receives this indication from another processor, it attempts to raise its uncore frequency, if possible within current power constraints of the processor. It may raise uncore frequency incrementally (one step at a time) or in larger steps that are based on the counter information, with higher counts triggering larger upticks in remote uncore frequency.

Note that in many embodiments, it is only beneficial to increase a remote frequency so that a remote snoop response is timed to arrive at the home agent substantially at the same time as the local memory access. After this point, the local memory becomes the latency determiner and there is no latency benefit from further increasing in remote processor frequency.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple cores 120a-120n. In addition, each core may be associated with an individual voltage regulator 125a-125n. Accordingly, a fully integrated voltage regulator (FIVR) implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. As will be described herein via one or more QPI interfaces, uncore frequency coordination messages may be communicated between processor sockets of a multiprocessor system. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to perform uncore frequency control in accordance with an embodiment of the present invention. Furthermore, PCU 138 may be coupled via a dedicated interface to external voltage regulator 160. In this way, PCU 138 can instruct the voltage regulator to provide a requested regulated voltage to the processor.

While not shown for ease of illustration, understand that additional components may be present within processor 110 such as additional uncore logic and other components such as internal memories, e.g., one or more levels of a cache memory hierarchy, a coherency controller such as a home agent and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the remote processor latency detection and uncore frequency control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). Note that as more cores of a processor socket enter into deeper low power states, the activity level of the processor reduces and accordingly, so too may the uncore frequency, according to certain power management features of the processor such as implemented via the PCU.

In an embodiment, a dedicated communication protocol is provided for inter-processor frequency coordination. When the low remote processor frequency control feature is triggered in a processor, one or more messages according to this protocol are sent over an inter-processor interconnect (such as a QPI link or other point-to-point (PtP) interconnect that couples different processor sockets of a multiprocessor system). This message thus provides signaling that a processor has detected a condition that indicates inter-processor frequency coordination (and, optionally, the frequency it is requesting). In different embodiments, this communication protocol may be implemented in either a peer-to-peer manner (where each processor has the same behavior and sends requests to all other processors when it seeks frequency coordination), or in a master-slave manner (where a processor is designated as master and collects information from other processors, makes a decision, and sends requests to all other processors). In either case, the system behavior is the same.

Note that this requested updated frequency may be at a floor frequency that is deadlock-free. For example, setting the floor frequency to a maximum of the uncore frequencies of all the other processors would lead to a deadlock scenario where no processor could reduce its uncore frequency, thus adversely affecting power savings. A corresponding deadlock-free example is to select a floor frequency that is less than a maximum of the uncore frequencies of all the other processors by a predetermined amount (such as 1 or 2 bin frequencies (where a bin frequency is 100 megahertz (MHz), in an embodiment)). In this way, processors may be allowed to reduce frequency as workload behavior changes.

Figure 2:
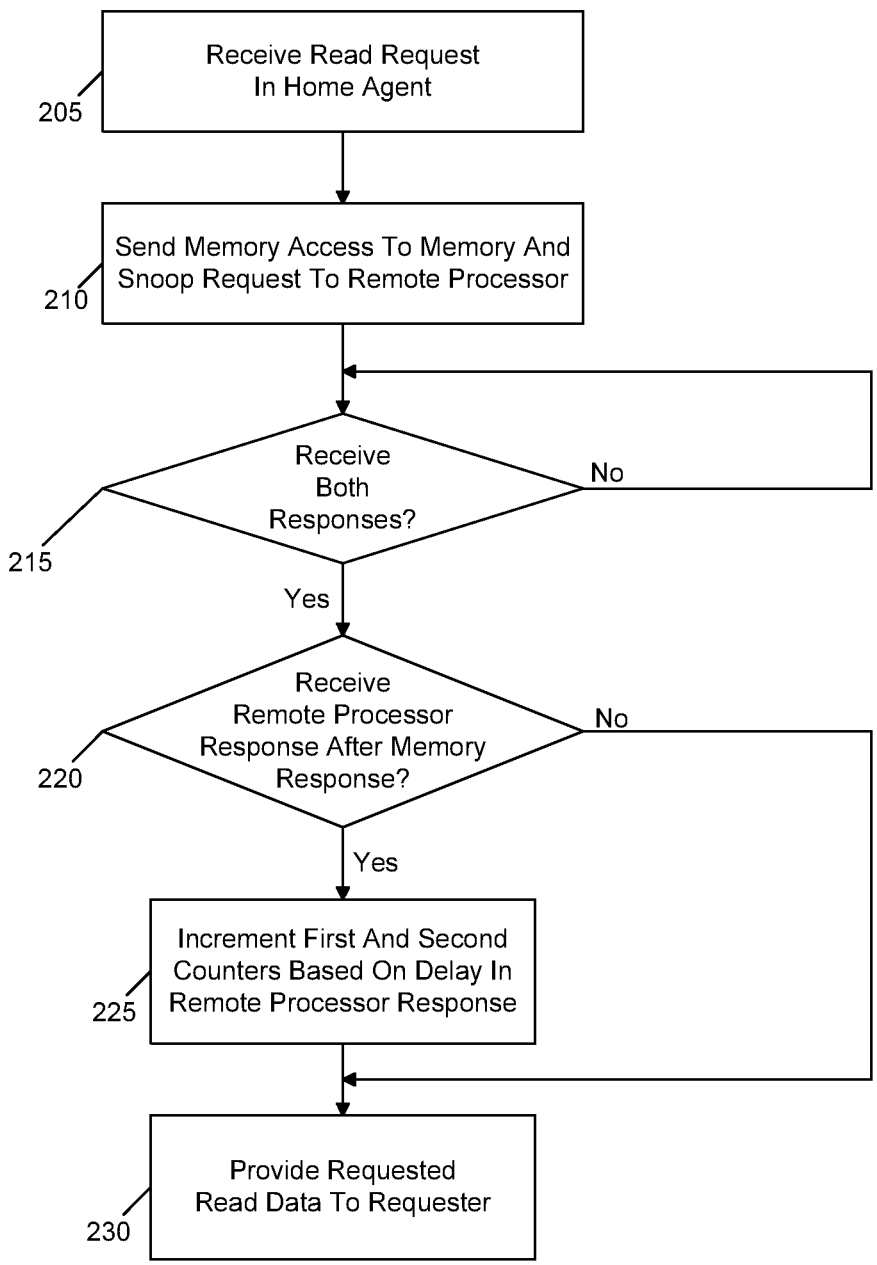
FIG. 2 is a flow diagram of a method in accordance with an embodiment of the present invention.

Referring now to FIG. 2, shown is a flow diagram of a method in accordance with of an embodiment of the present invention. As shown in FIG. 2, method 200 may be performed by logic of a home agent or other circuitry of a processor. Note that these operations shown in FIG. 2 are with regard to a home agent that owns the local memory and provides responses to various memory requests from agents such as cores of the local processor socket. In general, method 200 may be used to analyze information regarding receipt of responses to various transactions in order to determine whether an excessive latency is occurring with regard to such responses received from remote processor sockets. As seen, method 200 begins by receiving a read request in a home agent (block 205). This read request may come from a core of the processor, which seeks to read a given piece of data located at a particular memory address. Assume for purposes of discussion that this memory address is located in a portion of a system memory local to the processor. In the course of performing this read request, one or more snoop requests are sent to remote processor sockets to determine whether any copies of this requested data are present and if so whether they are in a modified state.

Still referring to FIG. 2, control passes to block 210 where the memory access can be sent to the memory and a snoop request can be sent to a remote processor socket. For example, assume a two processor socket system. Thus in addition to sending the read request via a memory controller to the local memory, a snoop request can be sent from the home agent to the remote socket to thus request a status of the requested data in that processor (if present). Next it can be determined whether both requests have been received in the home agent (diamond 215).

Control next passes to diamond 220 to determine whether the remote processor response was received after the memory response. Here, the memory response may be a read completion that includes the requested data. In turn, the response from the other processor socket is a snoop response indicating whether the requested data was present in a cache memory of the other processor socket and if so, its state.

If it is determined that the remote processor socket response is received after the memory response, control passes to block 225 where two counters can be incremented based on this delay in receiving the remote processor response. Specifically, these counters, which may be part of latency detection logic of a home agent, includes a first counter that maintains a count of transactions for which a response from a remote processor socket is delayed as compared to a response from local memory. The second counter may maintain a count of the number of cycles of these delayed responses. Thus for each response, a single increment can occur to the first counter while a variable amount of increment occurs to the second counter, namely corresponding to the difference in cycles between receipt of the memory response from the local memory and receipt of the corresponding snoop response from the remote processor socket. In either event, control passes to block 230 where the requested read data can be provided to the requester. Although shown at this high level in the embodiment of FIG. 2, understand the scope of the present invention is not limited in this regard.

Based on the count values, either this logic of the home agent or other processor logic (such as of a PCU) can determine whether the latency for receiving responses from one or more remote processor sockets is at an undesired high level and if so to take appropriate corrective action. In an embodiment, uncore frequency control logic of a PCU can read these counters at a predetermined interval, and based on the values of these counters determine whether a request for an updated uncore frequency in the one or more remote processor sockets is warranted. If so, the request can be generated and sent to the appropriate processor socket(s).

Figure 3A:
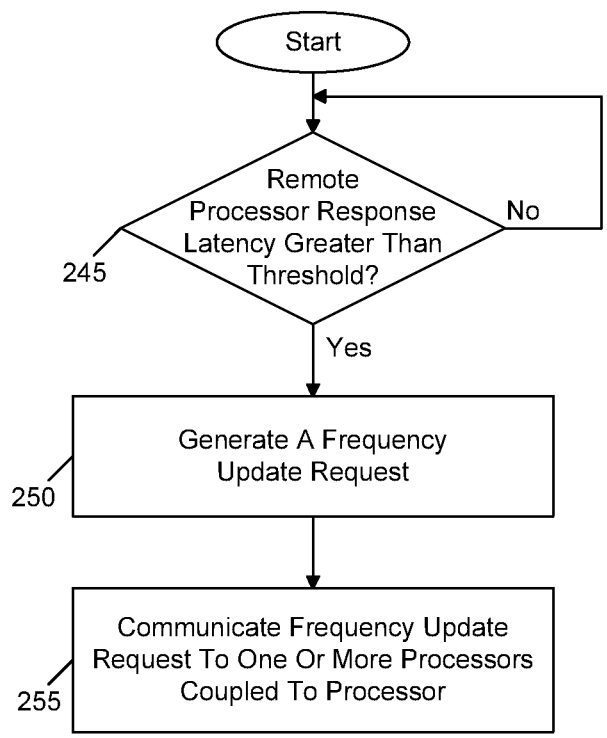
FIG. 3A is a flow diagram of a method for requesting frequency coordination in accordance with an embodiment of the present invention.

Referring now to FIG. 3A, shown is a flow diagram of a method for requesting frequency coordination in accordance with an embodiment of the present invention. Note that in FIG. 3A, method 240 can be implemented within various logic of a processor, such as PCU logic or a dedicated uncore frequency control logic, which may be a standalone logic or can be incorporated into a PCU, in some implementations. As seen, method 240 begins by determining whether remote processor response latency is greater than a threshold (diamond 245). As described above, values stored in a set of counters can be read to determine whether the remote processor latency exceeds this latency threshold. Although described in this embodiment with this counter-based latency determination, in other embodiments different detection mechanisms are possible to detect undesired remote processor latency.

Referring still to FIG. 3A, next at block 250 a frequency update request may be generated. This request can take different forms in various embodiments. For example, a request to update an uncore frequency can be generated, e.g., with a preprogrammed value for the updated uncore frequency. Or a calculation can be made. In yet other embodiments, a simple request to update frequency can be generated that in turn enables the receiving processor to perform a calculation as to an appropriate uncore frequency.

Still referring to FIG. 3A, control passes next to block 255 where the frequency update request can be communicated to one or more processors coupled to the processor. As discussed above, this communication may be via a PtP interconnect that couples the processors such as a QPI or other interconnect. Different types of messages can be sent, including, in an embodiment, a frequency control message that includes an encoding for this requested operation as well as an identification of the requested updated frequency value. Although shown at this high level in the embodiment of FIG. 3A, understand the scope of the present invention is not limited in this regard.

Figure 3B:
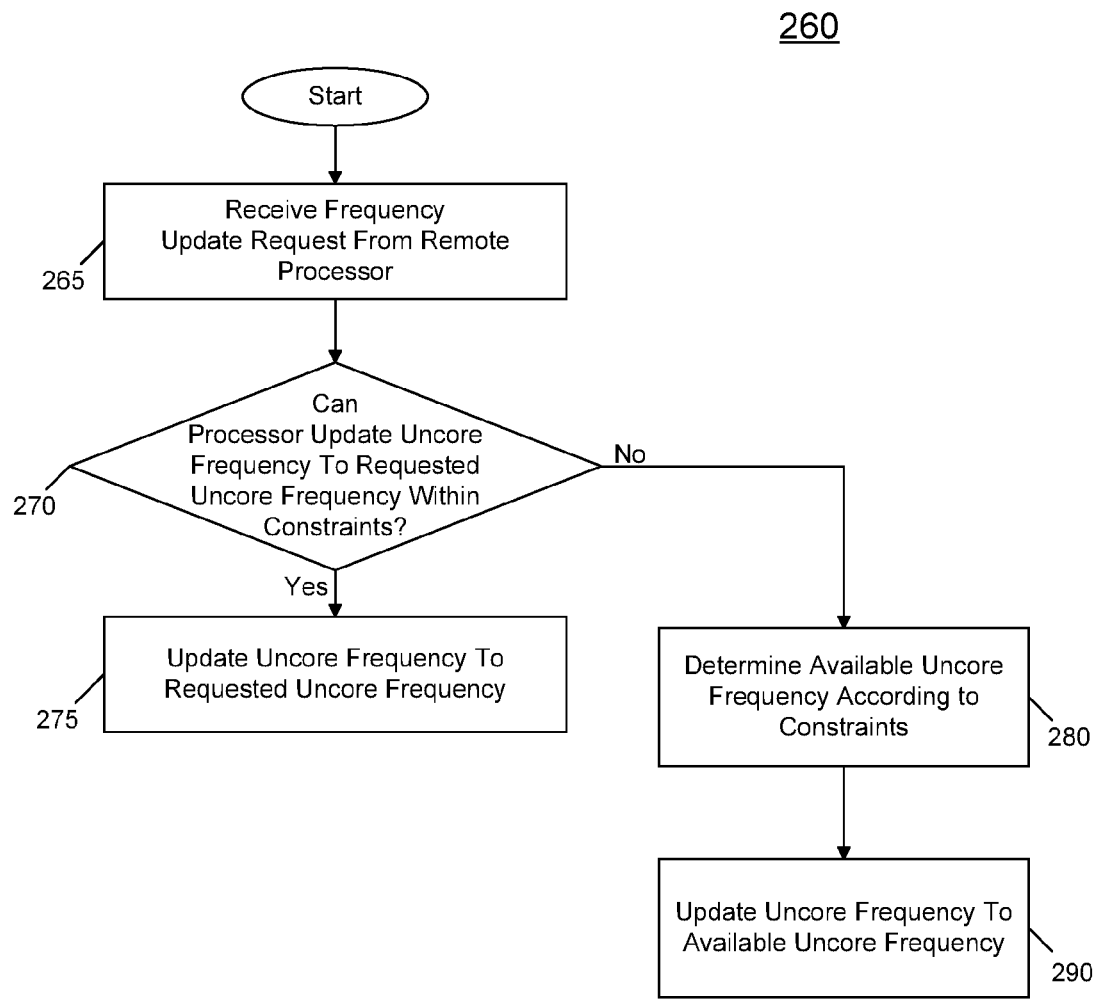
FIG. 3B is a flow diagram of a method for performing an uncore frequency update in accordance with an embodiment of the present invention.

Referring now to FIG. 3B, shown is a flow diagram of a method for performing an uncore frequency update in accordance with an embodiment of the present invention. This method can be performed by uncore frequency control logic of a processor, as with the above discussion of FIG. 3A, in some embodiments. However understand that this uncore frequency control logic that handles incoming requests for increased uncore frequency may be different than logic of a PCU that initiates a request to a remote processor for increased frequency within the remote processor. As seen, method 260 begins by receiving an uncore frequency request from a remote processor (block 265). As described above, this request can be received via a PtP interconnect and may include information such that the request can be directed to be received within the uncore frequency control logic. Note that this request may include a requested updated frequency or can simply be a request to update the uncore frequency. Next, control passes to diamond 270 where it can be determined whether the processor can update its uncore frequency to the requested uncore frequency, within various constraints of the processor. This determination may be made within the uncore frequency control logic, e.g., with input from a PCU that thus provides information regarding various constraints on the processor such as power and/or thermal constraints or the PCU may indicate whether an increased uncore frequency is allowed. In this way, the uncore frequency control logic can determine whether the requested uncore frequency (when the request includes a requested frequency value) can be effected. If so, control passes to block 275 where the uncore frequency can be updated to the requested uncore frequency. Thus this updated uncore frequency is at a greater value than a uncore frequency determined by the PCU for a current level of a workload being executed on the processor. Note here that this updated uncore frequency may be at a value higher (and potentially much higher) that a frequency needed to handle current activity of this local processor. Stated another way, this increased uncore frequency is to enable greater system performance overall, although it is not needed to handle the local processor workload.

Otherwise, if the processor cannot perform the update to the requested uncore frequency, control passes instead to block 280 where an available uncore frequency can be determined according to the processor constraints. The uncore frequency control logic can perform this determination or in some embodiments the PCU itself may make this determination. Finally, control passes to block 290 where the uncore frequency can be updated to the determined available uncore frequency. Although shown at this high level in the embodiment of FIG. 3B, understand the scope of the present invention is not limited in this regard.

Figure 4A:
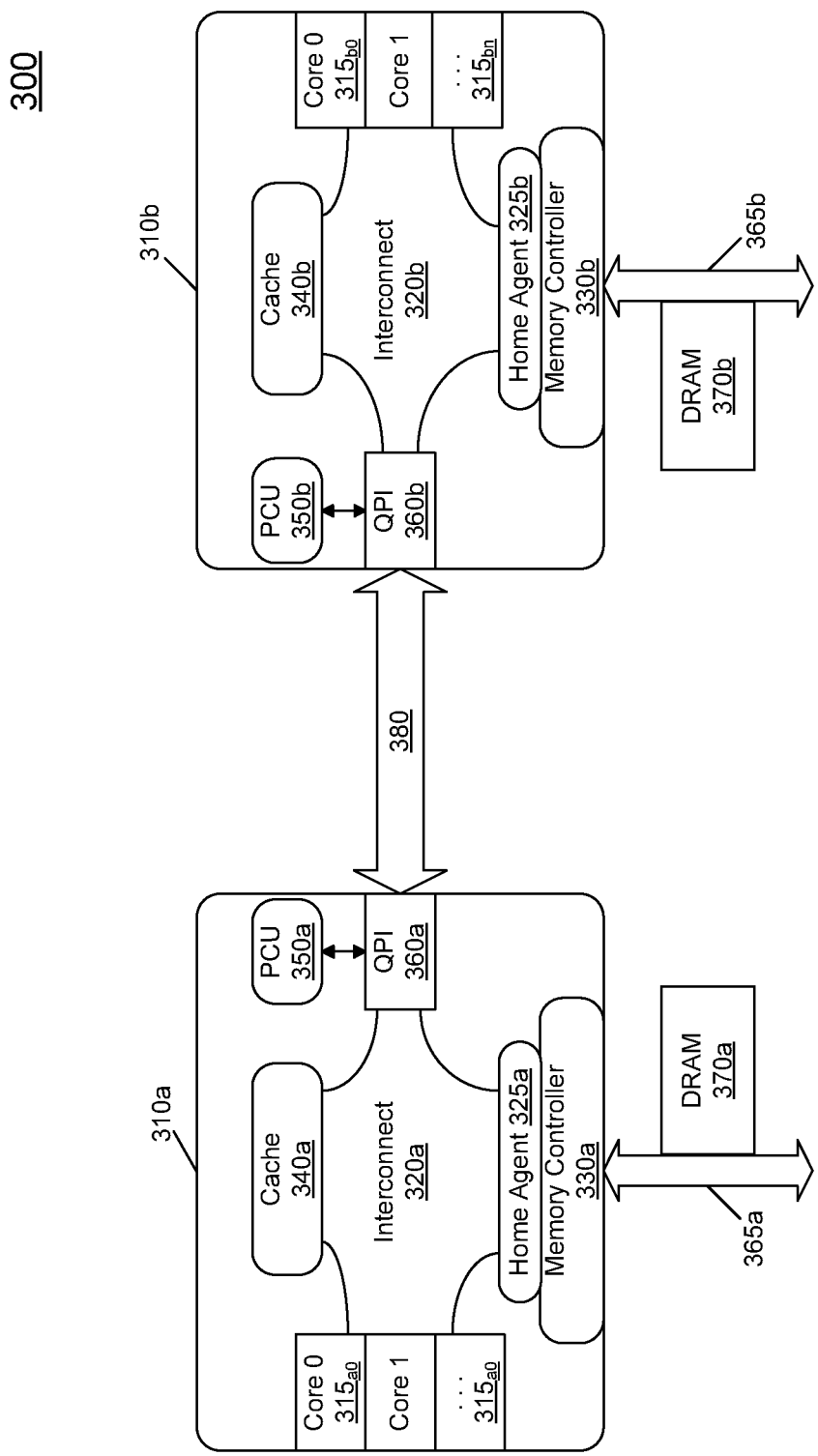
FIG. 4A is a block diagram of an example two processor system in accordance with an embodiment of the present invention.

Referring now to FIG. 4A, shown is a block diagram of an example two processor system in accordance with an embodiment of the present invention. As shown in FIG. 4A, system 300 is a multiprocessor system including a first processor socket 310a and a second processor socket 310b. Each of the sockets may be configured the same and thus only the components of processor socket 310a are discussed, although the same components are present in socket 310b. Of course in other embodiments, the processor sockets may be heterogeneous sockets in that different types of processors may be present, such as having different numbers of cores and other processing engines, differently sized cache memories, among other differences.

As seen, processor socket 310a includes a plurality of cores $315_{a0}$-$315_{an}$ that couple to other components of the socket via an interconnect 320a which in an embodiment can be a ring interconnect. Each of the cores may be of a common architecture or there can be cores of multiple micro-architectures. Each such core may include a local cache memory. In addition via interconnect 320a the cores are coupled to a cache memory 340a which in an embodiment is a shared cache memory such as a last level cache (LLC).

Also via interconnect 320a the cores couple to a home agent 325a that acts as a coherency controller, and includes latency detection logic in accordance with an embodiment of the present invention (not shown in FIG. 4A for ease of illustration). This latency detection logic is configured to determine an amount of latency for responses from one or more remote processor sockets to requests such as snoop requests issued by the home agent. More specifically, this latency may be a duration longer than receipt of a corresponding response received from a local memory for the same transaction. Using latency detection logic of the home agent, it can be determined whether excessive latencies are occurring as to responses received from one or more processor sockets and if so, an indication can be made to an appropriate entity of the processor that can generate a request to such remote processor socket(s) to attempt to reduce the latency. In turn, home agent 325a couples to a memory controller 330a that in turn couples to a local portion of a system memory. More specifically, via a memory interconnect 365a, memory controller 330a is coupled to and controls access to a dynamic random access memory (DRAM) 370a.

For purposes of discussion of embodiments herein, processor socket 310a includes an interface 360a which in an embodiment may be a QPI interface to provide interconnection between first processor socket 310a and second processor socket 310b via a QPI interconnect 380. As further shown, a PCU 350a (which may include uncore frequency control logic as described herein) is coupled to interface 360 to enable communication of frequency control messages between the cores.

Note that embodiments scale to a system with more than two processors as well. In systems where not all processors are connected to each other (for example, where the processors are arranged as a ring, torus or other non-fully-connected topology), intermediate processors act as a local repeater for frequency coordination requests, so that each processor can receive frequency coordination requests from all other processors in the system. Using an embodiment of the present invention, improved power/performance in multiprocessor platforms when running low-bandwidth latency-sensitive server workloads may be realized.

Figure 4B:
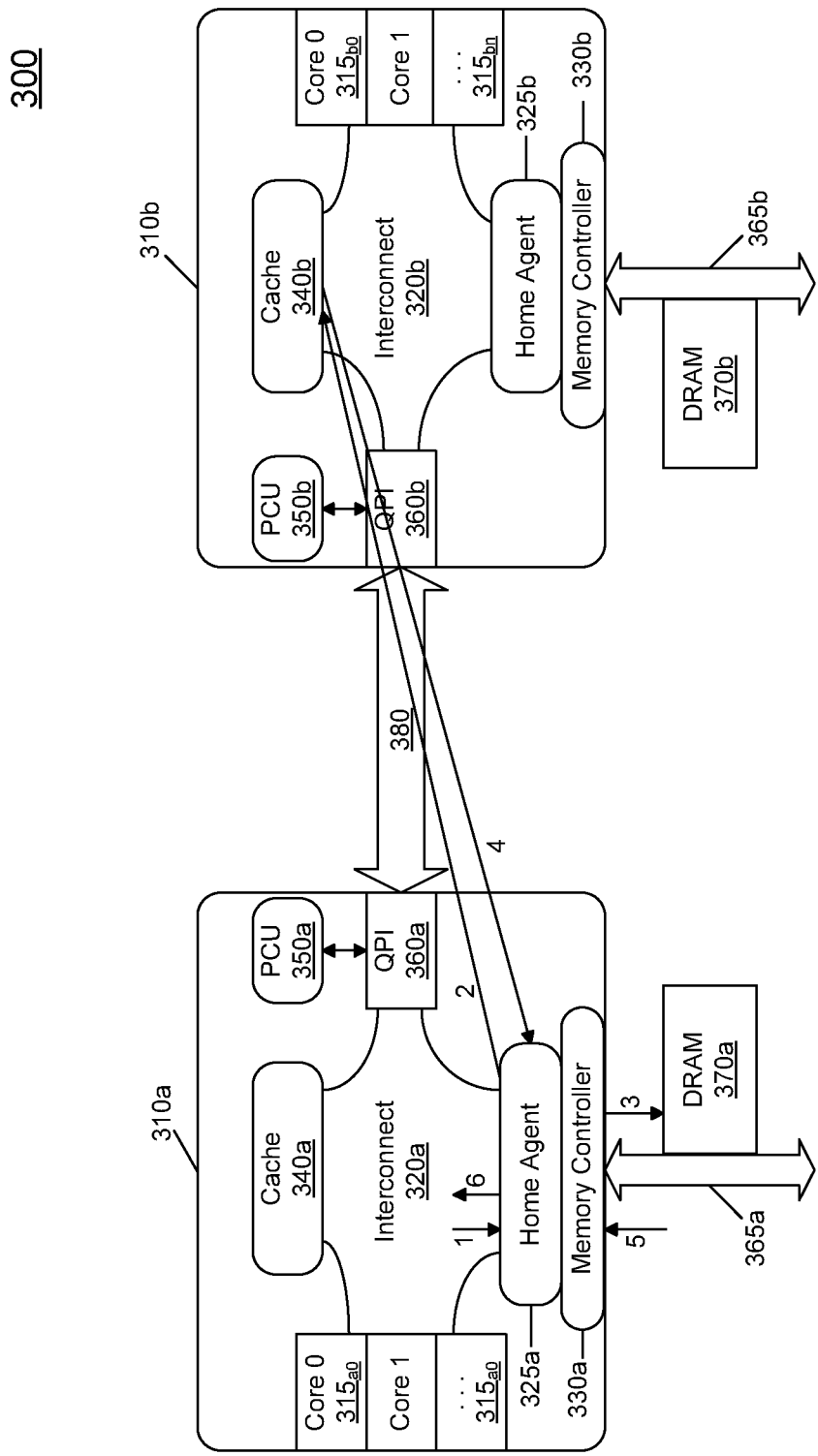
FIG. 4B is a block diagram illustrating a flow of communications regarding handling of a memory access request in accordance with an embodiment of the present invention.

FIG. 4B is a block diagram illustrating a flow of communications regarding handling of a memory access request in accordance with an embodiment of the present invention. As seen in FIG. 4B, first home agent 325a (or other coherency controller) receives a read request for a given address (1). This request may be part of a larger read transaction flow of a coherency protocol. To respond to the request, a snoop request (2) is sent to remote processor 310b and a memory access is sent to local memory 365a (3). The snoop request may be sent by home agent 325a or by the cache itself, depending on the implementation. In response, remote processor 310b sends a snoop response (4), and local memory 370a sends data for the read (5). Home agent 325a waits for both responses and resolves any conflicts before continuing with the rest of the flow, which includes sending a read completion to the requester. For optimal operation both responses may be received at home agent 325a at substantially the same time.

In an embodiment, home agent 325a includes counters to count the number of times and the number of cycles that a read completion was stalled waiting for a response from the remote processor (in other words, (4) occurred after (5)). These counters are read by the local PCU, which compares them with thresholds to determine whether to request an increase in the uncore frequency of remote processor 310b. If so, this request is generated and communicated from one PCU to the other by tunneling over interconnect 380. Note that when the counter counts are less than the associated thresholds for a given duration, the PCU may stop requesting an elevated uncore frequency from the remote processor socket, allowing the remote processor socket to return to a frequency based on its own activity level.

That is, frequency control logic of the PCU can either receive an indication of high latency from the home agent or can periodically read counter values or other information within the latency detection logic of the home agent to determine that such a latency exists and to take appropriate action, namely communication of a frequency coordination request.

Figure 5:
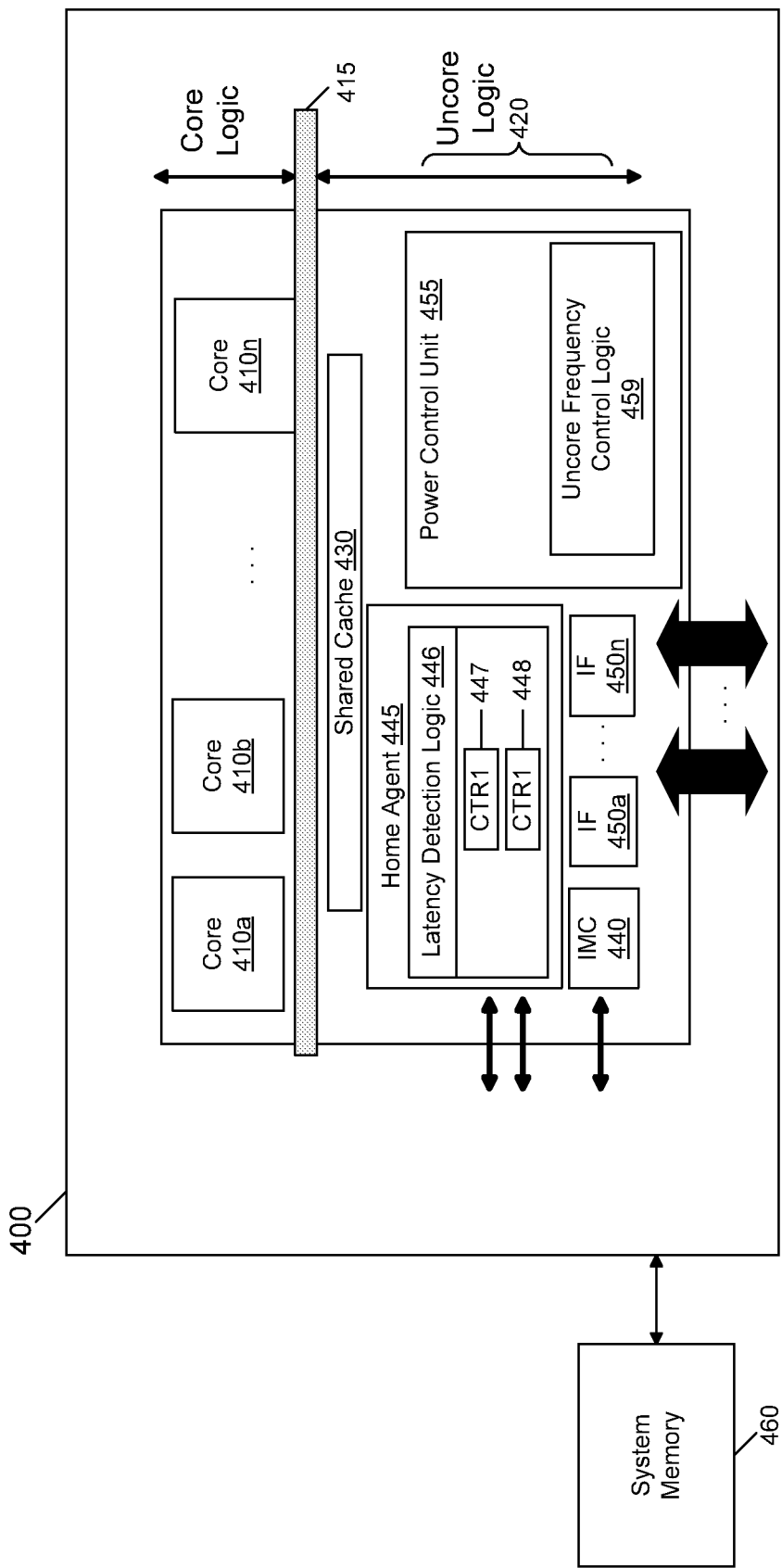
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores 410a-410n. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In the embodiment shown, the uncore further includes a home agent 445 including a latency detection logic 446. This logic may include a set of counters used for performing latency detection, including a first counter 447 and a second counter 448. In addition, the uncore may include an integrated memory controller 440, various interfaces 450 and a power control unit 455.

In various embodiments, power control unit 455 may include a uncore frequency control logic 459 in accordance with an embodiment of the present invention. As described above, this logic acts to determine whether an update to a remote processor's uncore frequency is called for (e.g., based on count values received from the counters of latency detection logic 446) and if so to generate a request for an updated uncore frequency to be communicated to one or more remote processors. In addition this logic may perform calculations responsive to messages received from remote processor sockets to enable a coordinated uncore frequency to be generated and communicated to the other processor sockets. Still further, this logic can receive an incoming request for an uncore frequency update and determine whether the requested uncore frequency update is allowed and if so to effect the change, as described herein.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
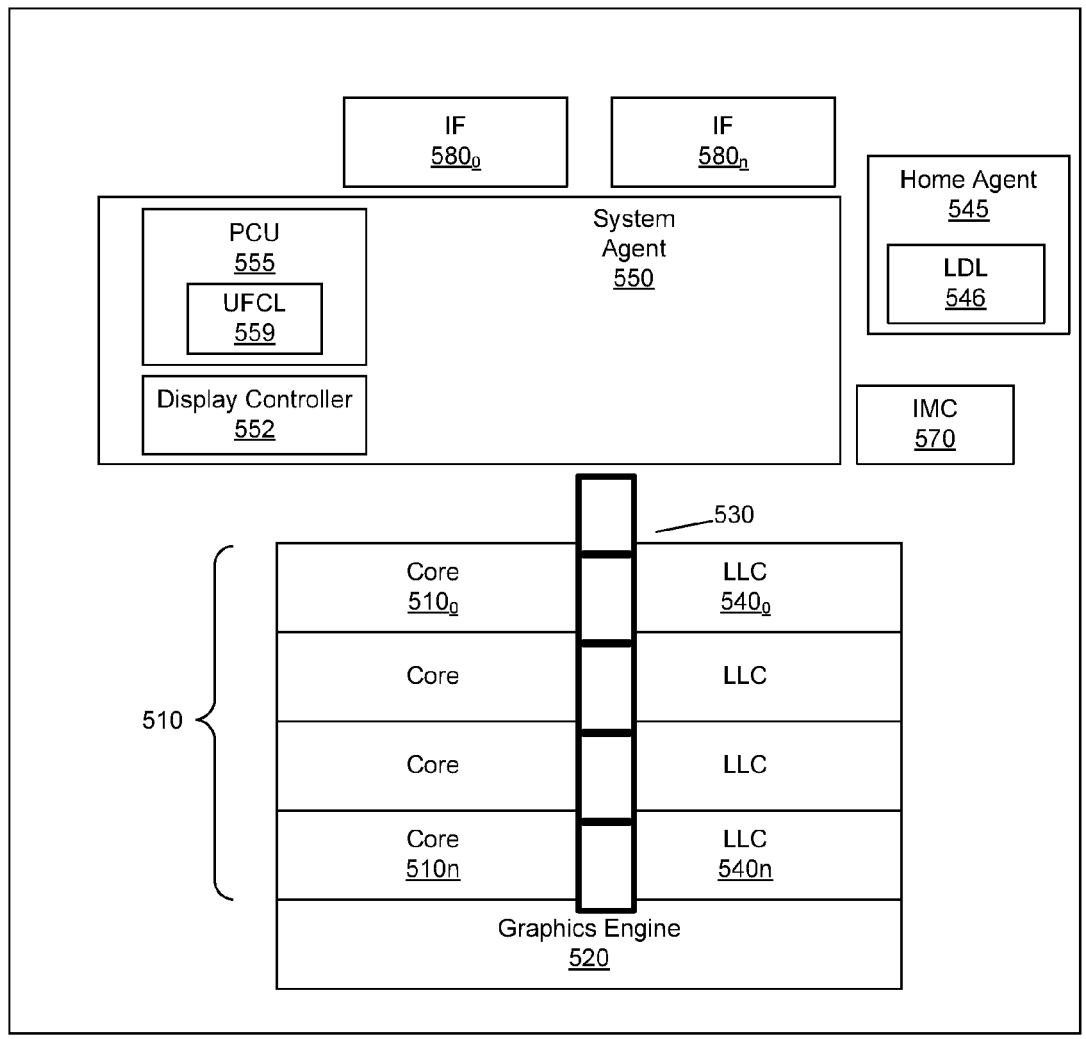
FIG. 6 is a block diagram of a processor in accordance with an embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include an uncore frequency control logic 559 in accordance with an embodiment of the present invention to enable control and/or coordination of uncore frequency in multiple sockets of a multiprocessor system. In various embodiments, this logic may execute the algorithms described above in FIGS. 3A and 3B.

As further seen in FIG. 6, processor 500 can further include an integrated memory controller (IMC) 570 that can provide for an interface to a system memory, such as a dynamic random access memory (DRAM). In turn, this local memory may be owned by a home agent 545 that includes latency detection logic 546 to determine whether remote processor socket responses received by home agent 545 have a latency greater than a threshold value. Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
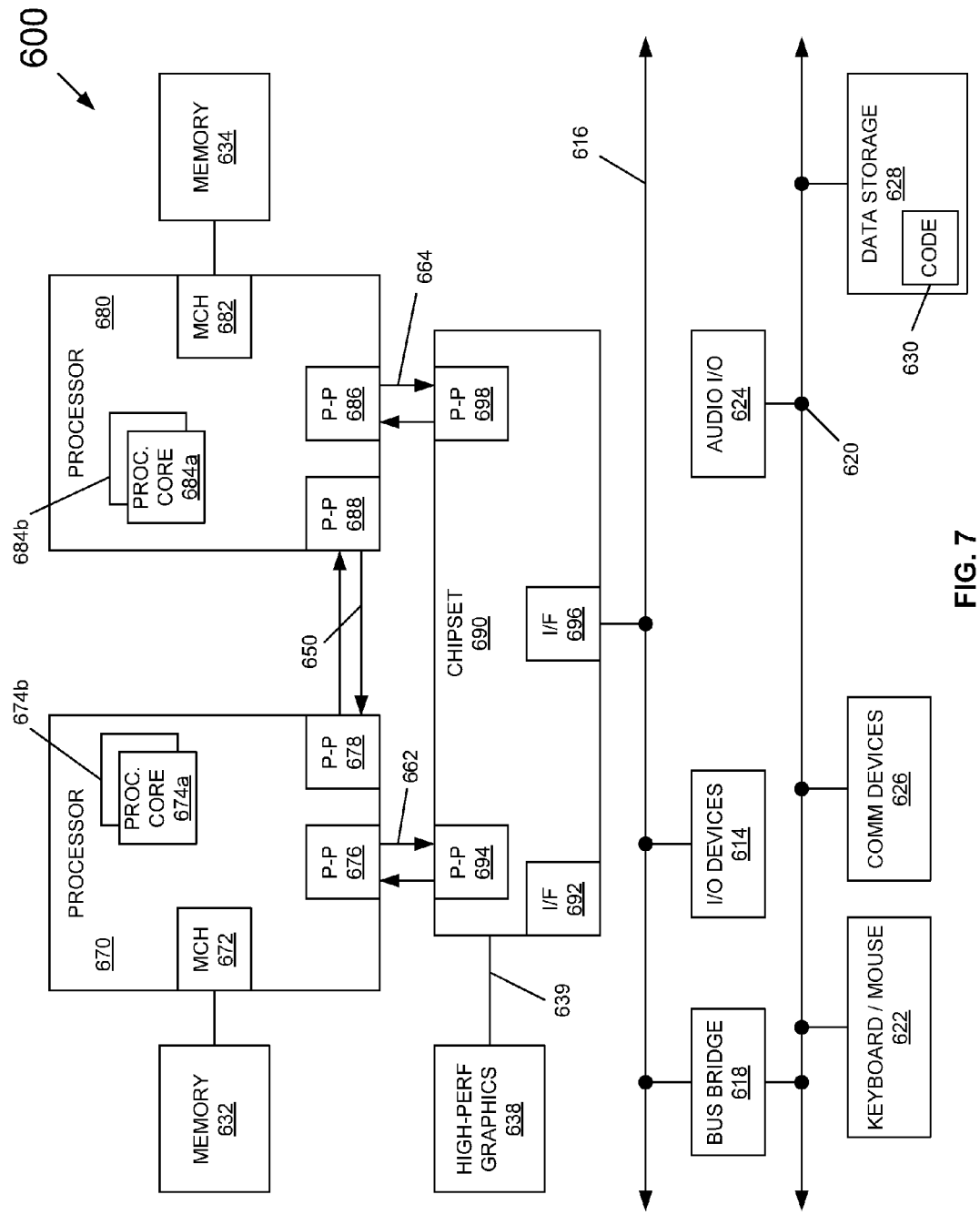
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of the processors can include a PCU, a home agent, and other logic to perform remote processor latency detection and uncore frequency control and coordination, as described herein.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core to execute instructions; and
   uncore logic coupled to the at least one core, the uncore logic including a first logic to receive memory access requests from the at least one core and to route the memory access requests to a local memory coupled to the processor and to route snoop requests corresponding to the memory access requests to at least one remote processor coupled to the processor, wherein the first logic is to maintain latency information regarding a difference between receipt of responses to the snoop requests from the at least one remote processor and receipt of responses to the memory access requests from the local memory.

2. The processor of claim 1, wherein the first logic includes a first counter to maintain a count of a number of instances in which a response from a remote processor regarding a snoop request was received after a response from the local memory regarding a corresponding memory access request.

3. The processor of claim 2, wherein the first logic is to increment the first counter per instance.

4. The processor of claim 2, wherein the first logic includes a second counter to maintain a count of a number of cycles for the number of instances.

5. The processor of claim 4, wherein the first logic is to update the second counter for each instance by a number of cycles of delay that the response from the remote processor was received after the response from the local memory.

6. The processor of claim 4, further comprising a power controller to receive the latency information, and responsive to the latency information, to generate a request for communication to the at least one remote processor to request frequency coordination between the processor and the at least one remote processor.

7. The processor of claim 6, wherein the power controller is to read the first counter and the second counter and to generate the request based at least on the first and second counters.

8. The processor of claim 1, wherein the processor and the at least one remote processor are of a multiprocessor platform.

9. The processor of claim 1, further comprising an uncore frequency control logic to receive a frequency coordination request from the at least one remote processor and to update a frequency for the uncore logic responsive to the frequency coordination request.

10. The processor of claim 9, wherein the uncore frequency control logic is to receive a plurality of frequency coordination requests each from a processor coupled to the processor and to select an updated frequency for the uncore logic corresponding to a frequency less than a maximum requested frequency of the plurality of frequency coordination requests by at least one bin frequency.

11. A non-transitory machine-readable medium having stored thereon instructions, which if performed by a machine cause the machine to perform a method comprising:
   receiving a first response in a first logic of a processor responsive to sending a memory access request to a first memory coupled to the processor and receiving a second response in the first logic responsive to sending a snoop request to a remote processor coupled to the processor;
   updating a first counter and a second counter based on a delay between receipt of the first response and receipt of the second response; and
   providing data obtained responsive to the memory access request to a requester.

12. The non-transitory machine-readable medium of claim 11, wherein the method further comprises incrementing the first counter per instance of the delay, the first counter to maintain a count of a number of instances in which a response from the remote processor to a snoop request was received after a corresponding response from the first memory to a memory access request.

13. The non-transitory machine-readable medium of claim 12, wherein the method further comprises incrementing the second counter for each instance by a number of cycles of the delay, the second counter to maintain a count of a number of cycles for the number of instances.

14. The non-transitory machine-readable medium of claim 11, wherein the method further comprises responsive to a value of the first counter and a value of the second counter, generating a request for communication to the remote processor to request frequency coordination.

15. The non-transitory machine-readable medium of claim 11, wherein the method further comprises:
   receiving a frequency update request in the processor from the remote processor; and
   updating a frequency of an uncore logic of the processor responsive to the frequency update request, wherein the updated frequency is at a value greater than a frequency determined by a power controller of the processor based on a workload being executed by the processor.

16. A system comprising:
   a first processor including at least one core to execute instructions, uncore logic coupled to the at least one core, a power control unit (PCU) coupled to the at least one core to control a power consumption level of the at least one core, the PCU including an uncore frequency control logic to receive a frequency coordination request from a second processor and to update a frequency for the uncore logic responsive to the frequency coordination request, and a communication interface to receive the frequency coordination request from the second processor via an interconnect;
   the second processor coupled to the first processor via the interconnect and including a second uncore logic, a second core, and a latency detection logic to determine a latency between receipt of a response to a snoop request received from the first processor and receipt of a corresponding response to a memory access request received from a second local memory coupled to the second processor, the second processor to generate the frequency coordination request based at least in part on the latency; and
   a first local memory coupled to the first processor and the second local memory coupled to the second processor.

17. The system of claim 16, wherein the second processor further comprises a home agent including the latency detection logic to receive the memory access request from the second core and to route the memory access request to the second local memory and to route the snoop request to the first processor.

18. The system of claim 16, wherein the latency detection logic comprises:
   a first counter to maintain a count of a number of instances in which a response from the first processor regarding a snoop request was received after a response from the second local memory regarding a corresponding memory access request; and
   a second counter to maintain a count of a number of cycles for the number of instances.

19. The system of claim 18, wherein the latency detection logic is to update the first counter per instance and update the second counter for each instance by a number of cycles of delay that the response from the first processor was received after the response from the second local memory.

20. The system of claim 16, wherein the second processor further comprises a second uncore frequency control logic to receive information regarding the latency and responsive to the latency information, to generate the frequency coordination request.

21. The system of claim 16, wherein the first processor is to receive a plurality of frequency coordination requests each from a processor coupled to the first processor and to select an updated frequency corresponding to a frequency less than a maximum requested frequency of the plurality of frequency coordination requests by at least one bin frequency, and to communicate the selected updated frequency to each of the processors.

22. The system of claim 16, wherein responsive to the updated uncore logic frequency, a home agent of the second processor is to receive a second response to a second snoop request from the first processor and a corresponding second response to a second memory access request from the second local memory at substantially the same time.

* * * * *